US012081957B2

(12) United States Patent
Yang et al.

(10) Patent No.: US 12,081,957 B2
(45) Date of Patent: Sep. 3, 2024

(54) SOUND-PRODUCING DEVICE AND ELECTRONIC TERMINAL

(71) Applicant: Goertek Inc., Shandong (CN)

(72) Inventors: Jianbin Yang, Weifang (CN); Shousong Qiang, Weifang (CN); Chunfa Liu, Weifang (CN)

(73) Assignee: Goertek Inc., Shandong (CN)

( * ) Notice: Subject to any disclaimer, the term of this patent is extended or adjusted under 35 U.S.C. 154(b) by 176 days.

(21) Appl. No.: 17/773,211

(22) PCT Filed: Nov. 5, 2020

(86) PCT No.: PCT/CN2020/126808
§ 371 (c)(1),
(2) Date: Apr. 29, 2022

(87) PCT Pub. No.: WO2021/088930
PCT Pub. Date: May 14, 2021

(65) Prior Publication Data

US 2022/0394390 A1 Dec. 8, 2022

(30) Foreign Application Priority Data

Nov. 8, 2019 (CN) ......................... 201911089642.2

(51) Int. Cl.
*H04R 25/00* (2006.01)
*H04R 9/04* (2006.01)
*H04R 9/06* (2006.01)
*H04R 7/20* (2006.01)

(52) U.S. Cl.
CPC ............... *H04R 9/043* (2013.01); *H04R 9/06* (2013.01); *H04R 7/20* (2013.01)

(58) Field of Classification Search
CPC ...... H04R 2400/11; H04R 9/043; H04R 9/06; H04R 9/02; H04R 9/04
USPC .......................................................... 381/403
See application file for complete search history.

(56) References Cited

U.S. PATENT DOCUMENTS 5,757,945 A * 5/1998 Sakamoto ................ H04R 9/06 381/400
7,515,727 B2 * 4/2009 Watanabe ............ H04R 31/006 381/409
9,942,680 B1 * 4/2018 Little ................... H04R 31/006
10,863,257 B1 * 12/2020 Pierce ...................... H04R 1/06
(Continued)

FOREIGN PATENT DOCUMENTS

CN 205754835 U 11/2016
CN 110662155 A 1/2020

*Primary Examiner* — Phylesha Dabney
(74) *Attorney, Agent, or Firm* — Baker Botts LLP

(57) ABSTRACT

Disclosed are a sound-producing device and an electronic terminal. The sound-producing device comprises: a voice coil, the voice coil including a bobbin and a voice coil body wound outside the bobbin; the voice coil body is configured to be able to be input an electrical signal; a conductive member, the conductive member including a first connecting part connected with the voice coil, a second connecting part fixed to the sound-producing device, and an elastic part connected between the first connecting part and the second connecting part; the elastic part is in a planar structure, and is at least located in the same plane as the first connecting part; the conductive member is configured to input an electrical signal to the voice coil.

16 Claims, 5 Drawing Sheets

(56) References Cited

U.S. PATENT DOCUMENTS

| | | | | |
|---|---|---|---|---|
| 2005/0111689 | A1* | 5/2005 | True | H04R 31/006 381/423 |
| 2019/0149924 | A1* | 5/2019 | Cheng | H04R 9/025 381/412 |
| 2022/0377465 | A1* | 11/2022 | Yang | H04R 9/046 |
| 2022/0408192 | A1* | 12/2022 | Yang | H04R 9/043 |
| 2022/0417664 | A1* | 12/2022 | Hsu | H05K 1/0277 |
| 2023/0199393 | A1* | 6/2023 | Chen | H04R 9/045 381/430 |
| 2023/0232157 | A1* | 7/2023 | Liu | H04R 9/043 381/400 |

* cited by examiner b: A Sound-producing Device Installed with a Prior Art Damper: Resonant Frequency F0 = 195 Hz c: A Sound-producing Device Installed with the Conductive Member of the Present Disclosure: Resonant Frequency F0 = 170 Hz b: A Sound-producing Device Installed with the a Prior Art Damper c: A Sound-producing Device Installed with the Conductive Member of the Present Disclosure b: Acute Angle α=15°; c: Acute Angle α=25°; d: Acute Angle α=35°

SOUND-PRODUCING DEVICE AND ELECTRONIC TERMINAL

CROSS-REFERENCE TO RELATED APPLICATION

This application is a National Stage of International Application No. PCT/CN2020/126808, filed on Nov. 5, 2020 which claims priority to Chinese Patent Application No. 201911089642.2, filed on Nov. 8, 2019, both of which are hereby incorporated by reference in its entirety.

TECHNICAL FIELD

The present disclosure relates to the technical field of electro-acoustic conversion, and particularly to a sound-producing device and an electronic terminal.

BACKGROUND

A speaker is a basic sound-producing unit that converts electrical signals into acoustic signals. A damper is an assembly in the speaker that adjusts the vibration direction of a vibration diaphragm, and functions to suppress the polarization of the vibration diaphragm through the mechanical restoring force, so its function is relatively single. In an ordinary speaker, the lead wire is connected to a terminal and a voice coil respectively, and is used to receive electrical signals from the outside of the speaker and transmit them to the voice coil.

In the trend of miniaturization of speaker products, the lead wire is one of the main factors that prevent the volume of the speaker products from being reduced, because the lead wire needs to vibrate together with the voice coil during the operation of the speaker and thus needs to be provided with a certain vibration space for the vibration thereof if it is necessary to maintain the wiring of the lead wire. In this case, the miniaturization of the speaker products is bound to impair the acoustic performance of the speaker.

Therefore, it is necessary to improve the structure of the damper and the connection method between the damper and the voice coil, so as to simultaneously deal with the hindrance to the reduction of the speaker's volume and the energization of the voice coil.

SUMMARY

An object of the present invention is to provide a sound-producing device with a small volume and good acoustic performance.

A sound-producing device, comprising:

- a voice coil, the voice coil including a bobbin and a voice coil body wound outside the bobbin; the voice coil body is configured to be able to be input an electrical signal;
- a conductive member, the conductive member including a first connecting part connected with the voice coil, a second connecting part fixed to the sound-producing device, and an elastic part connected between the first connecting part and the second connecting part; the elastic part is in a planar structure, and is at least located in the same plane as the first connecting part;
- the conductive member is configured to input an electrical signal to the voice coil.

Optionally, the first connecting part of the conductive member is connected to a side of the voice coil body close to an end face of the voice coil body such that the conductive member is in electrical communication with the voice coil.

Optionally, the side of the voice coil body is provided with a first pad at a connection corresponding to the first connecting part, and the conductive member is in electrical communication with the voice coil via the first pad.

Optionally, an enameled wire for transmitting the electrical signal extends from the voice coil body, and the first pad is welded and fixed to the enameled wire and the first connecting part respectively such that the conductive member is in electrical communication with the voice coil body.

Optionally, the first pad is provided with a bending structure protruding from the side of the voice coil body, and the bending structure is configured to hold the conductive member in position.

Optionally, the first connecting part of the conductive member is connected to a side of the bobbin, and the side of the bobbin is provided with a second pad at a connection corresponding to the first connecting part, and the conductive member is in electrical communication with the voice coil via the second pad.

Optionally, the conductive member is of a separated structure and includes at least two conductors, each of which includes a first connecting part, a second connecting part and an elastic part connected between the first connecting part and the second connecting part.

Optionally, the conductive member includes four conductors connected to the voice coil at the same height.

Optionally, the conductive member includes four conductors, wherein first connecting parts of two adjacent conductors are connected to each other to form a first connection bridge, and first connecting parts of the other two conductors are connected to each other to form a second connection bridge; the conductive member is in electrical communication with the voice coil via the first connection bridge and the second connection bridge.

Optionally, the second connecting part of the conductive member is formed in a hook structure, the sound-producing device is provided with a hanger column therein, and the hook structure is sleeved on the hanger column.

Optionally, the sound-producing device further includes a magnetic conductive part in which a magnet is provided, the voice coil is provided in the magnetic conductive part and is subjected to the magnetic field of the magnet; the magnetic conductive part is provided with an avoidance slot, and after the conductive member is connected with the voice coil body, the conductive member passes through the avoidance slot and is fixed on the sound-producing device.

Optionally, the conductive member is formed by integrally winding a metal wire;

- the second connecting part includes a hook structure, is in a plane shape, and is located in the same plane as the first connecting part and the elastic part;
- or, the second connecting part includes at least two hook structures whose orthographic projections in a vertical direction overlap.

Optionally, a width of the elastic part gradually increases along a direction from the first connecting part to the second connecting part, with extension lines of two sides of the elastic part in its width direction intersecting at a point in the direction in which the first connecting part faces away from the second connecting part and forming an acute angle.

Optionally, the acute angle is no less than 10°.

Optionally, the sound-producing device has a resonance frequency F0 of 50 Hz to 300 Hz; in a frequency range of 100 Hz to 300 Hz, the sound-producing device has a total harmonic distortion THD of less than 10%.

Optionally, the sound-producing device is a round sound-producing device or a square sound-producing device.

Optionally, the sound-producing device is a large bass or mid-range sound-producing device.

Optionally, the present invention also proposes an electronic terminal, comprising the above sound-producing device.

Optionally, the electronic terminal is a car audio or a speaker.

The beneficial effect of the technical solution of the present invention is: by using the conductive member instead of the lead wire, not only can the electrical signal be transmitted for the voice coil, but also the internal space of the sound-producing device can be reduced, thereby reducing the volume of the sound-producing device.

Other features and advantages of the present disclosure will be readily apparent from the following detailed description of exemplary embodiments of the present disclosure with reference to the drawings.

BRIEF DESCRIPTION OF THE DRAWINGS

The accompanying drawings, which are incorporated into this specification and constitute a part thereof, illustrate embodiments of the present disclosure and, together with the description, serve to explain the principles of the present disclosure.

Figure 1:
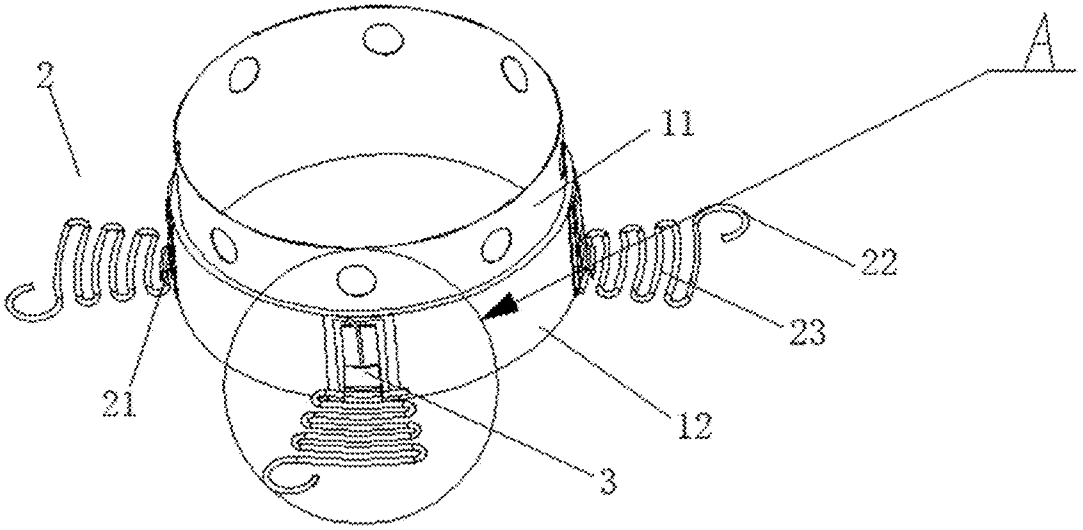
FIG. 1 is an installation diagram of a conductive member according to an embodiment of the present invention.
Figure 2:
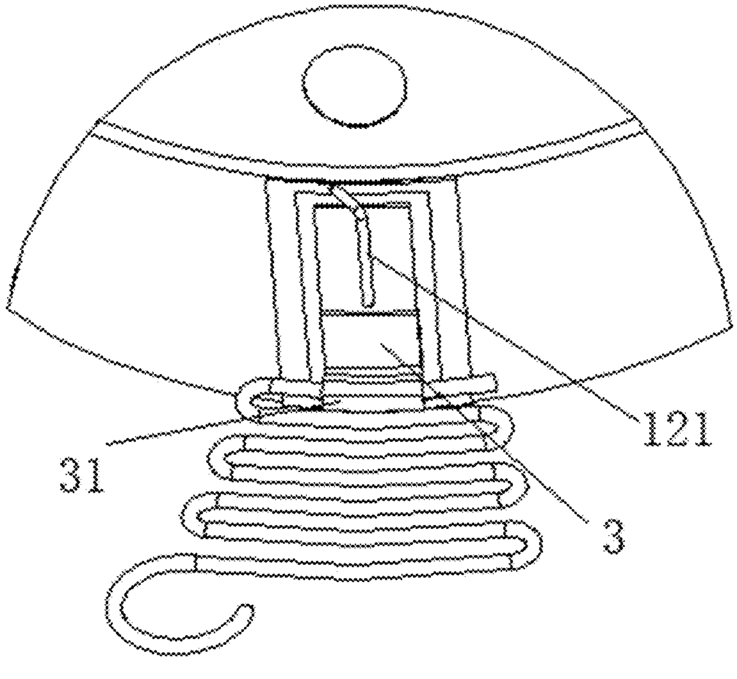
FIG. 2 is a partial enlarged view of FIG. 1.
Figure 3:
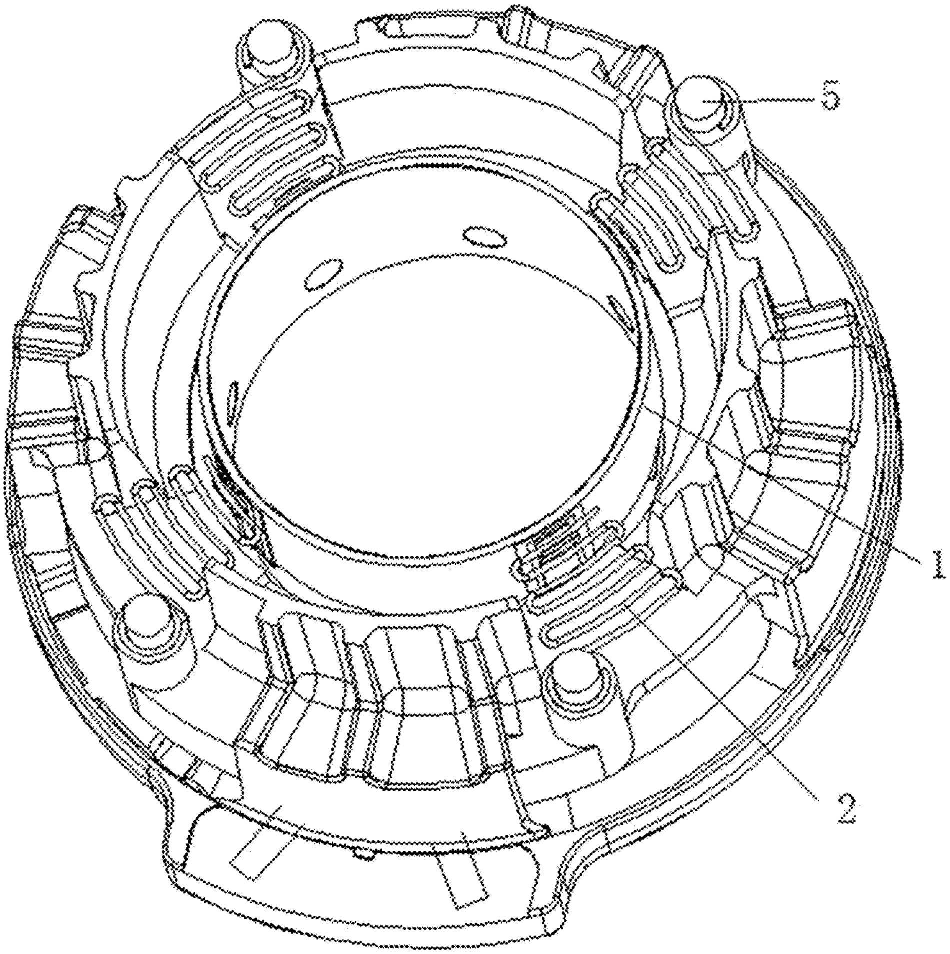
FIG. 3 is a schematic diagram of a partial structure of a sound-producing device according to an embodiment of the present invention.
Figure 4:
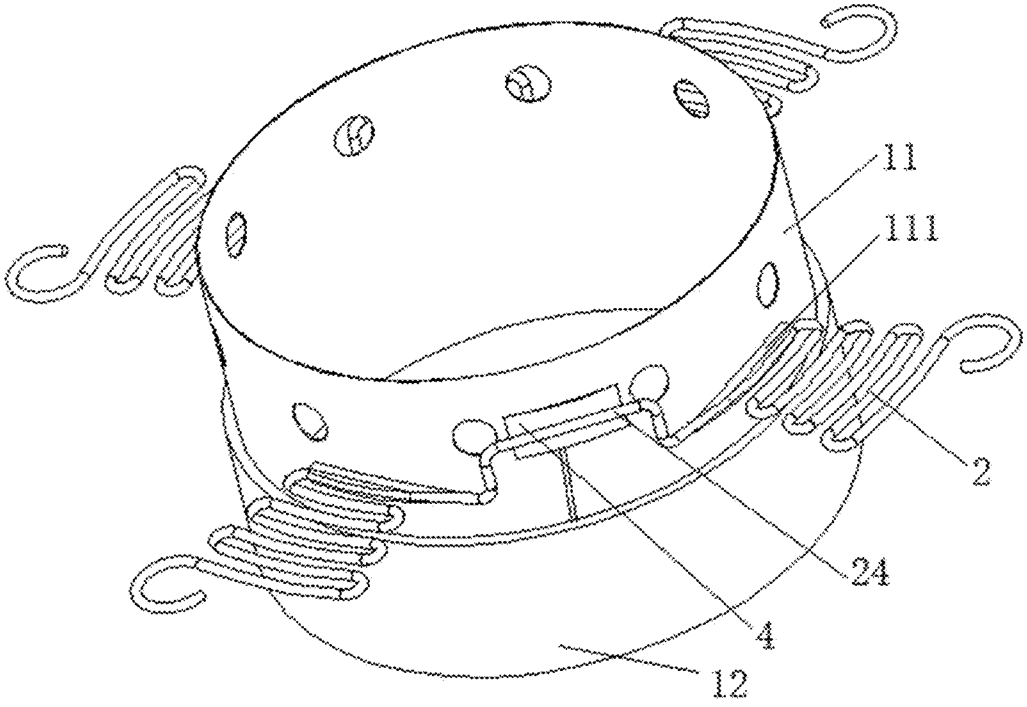
FIG. 4 is an installation diagram of a conductive member according to an embodiment of the present invention.
Figure 5:
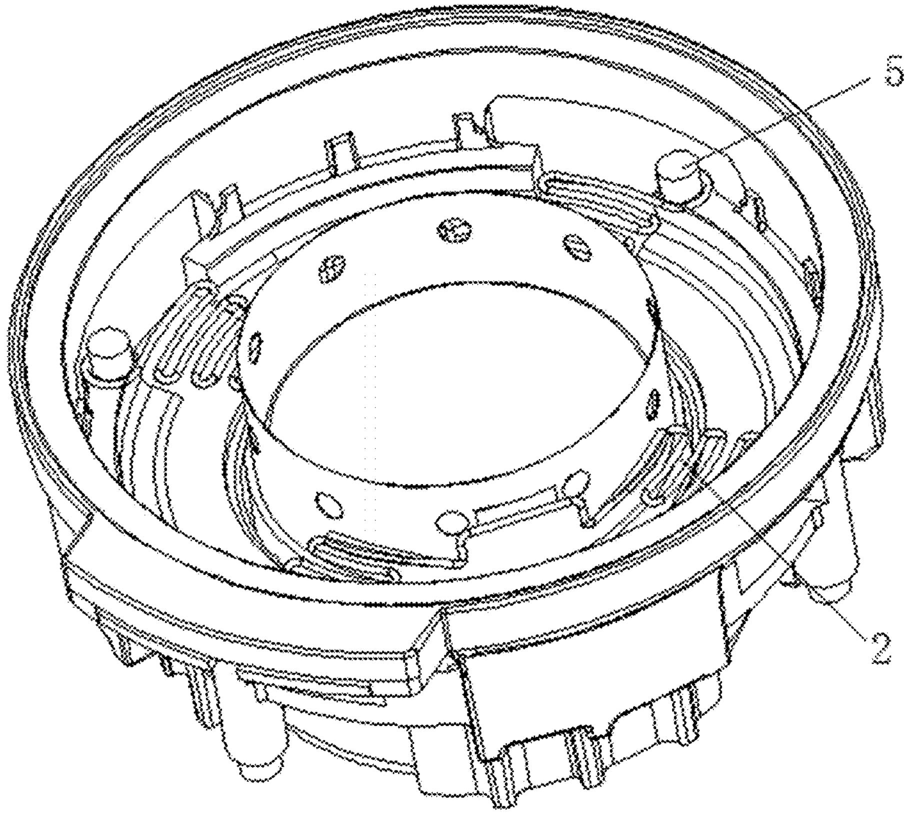
FIG. 5 is a schematic diagram of a partial structure of a sound-producing device according to an embodiment of the present invention

The figures are marked as follows: voice coil; 11—bobbin; 111—groove; 12—voice coil body; 2—conductive member; 21—first connecting part; 22—second connecting part; 23—elastic part; 24—connection bridge; 3—first pad; 31—bending structure; 4—second pad; 5—hanger column.

DETAILED DESCRIPTION

Various exemplary embodiments of the present disclosure will now be described in detail with reference to the accompanying drawings. It is to be noted that unless otherwise specified, relative arrangement, numerical expressions and numerical values of components and steps illustrated in these embodiments do not limit the scope of the present disclosure.

Description to at least one exemplary embodiment is in fact illustrative only, and is in no way limiting to the present disclosure or application or use thereof.

Techniques, methods and devices known to those skilled in the prior art may not be discussed in detail; however, the techniques, methods and devices shall be regarded as part of the description where appropriate.

In all the illustrated and discussed examples, any specific value shall be explained as only exemplary rather than restrictive. Thus, other examples of exemplary embodiments may have different values.

It is to be noted that similar reference numbers and alphabetical letters represent similar items in the drawings below, such that once a certain item is defined in a drawing, further discussion thereon in the subsequent drawings is no longer necessary.

A speaker is a sound-producing unit. A damper is an assembly in the speaker for adjusting the vibration direction of a vibration diaphragm. A conventional damper is in a loop shape which is radially arranged in a corrugated configuration, and is typically made of conex, blends, cloth, and the like. When the voice coil has a large amplitude, the damper has poor compliance Cms, that is, the mechanical stiffness value Kms is large (Kms and Cms are reciprocal to each other), and the compliance is poor in symmetry. This results in a larger resonance frequency F0 of the speaker, which will cause poor bass sensitivity for speaker products. This reduces the acoustic performance of the speaker and greatly affects the user's experience.

In addition, since the traditional damper is usually made of chemical fiber, blends, etc., its hardness increases under high temperature and humid environment. This causes the damper to be easily deformed or even broken, and the fatigue performance of the damper is reduced and prone to failure, which will directly lead to the failure of the speaker, thus significantly shortening the service life of the speaker.

Ordinary speaker uses a lead wire to input the electrical signal to the voice coil, while the lead wire needs a certain space for vibration. In the trend of miniaturization of speaker products, reducing the size of the speaker will impair the acoustic performance of the speaker.

Therefore, the present invention proposes a sound-producing device, which aims to solve the problems of existing speakers.

A sound-producing device, comprises:

a voice coil, the voice coil including a bobbin and a voice coil body wound outside the bobbin; the voice coil body is configured to be able to be input an electrical signal;

a conductive member, the conductive member including a first connecting part connected with the voice coil, a second connecting part fixed to the sound-producing device, and an elastic part connected between the first connecting part and the second connecting part; the conductive member is formed by integrally winding a metal wire; the elastic part is in a planar structure, and is at least located in the same plane as the first connecting part.

The conductive member is configured to input an electrical signal to the voice coil.

As an embodiment of the present invention, the above sound-producing device comprises a voice coil 1. Said voice coil is a composite structure comprising a round tube-shaped bobbin 11 and a voice coil body 12 wound outside of the bobbin. Said bobbin provides support for the voice coil body, and the voice coil body can be a coil capable of being input an electrical signal. The sound-producing device also includes a magnetic circuit system in which the voice coil is provided and is subjected to the magnetic force of a magnetic field. When the voice coil is input an electrical signal, it vibrates under the magnetic field, thereby driving the vibration diaphragm connected with it to vibrate. The vibration diaphragm vibrates to cause the air particles around it to move, thereby producing sound.

The sound-producing device also includes a conductive member 2, which includes a first connecting part 21 connected to the voice coil. Optionally, the first connecting part may be connected to the voice coil body or to the bobbin. The conductive member also includes a second connecting part 22 that is fixedly connected to the sound-producing device, and an elastic part 23 that extends curvedly from the first connecting part to the second connecting part. The conductive member can be used to input an electrical signal into the voice coil.

In the existing sound-producing device, the lead wire is usually used as a conductive element of the voice coil. In the present invention, since the conductive member can input the electrical signal into the voice coil, it can be used as the conductive element of the voice coil instead of the lead wire in the prior art.

As an embodiment, the first connecting part of the conductive member is connected to a side of the voice coil body close to an end face of the voice coil body. That is, the conductive member is connected to the voice coil body via the first connecting part, such that the conductive member is in electrical communication with the voice coil. Optionally, the first connecting part may be connected to the side of the voice coil body close to the end surface, that is, the root of the voice coil body, or can be connected to the side of the voice coil body away from the end surface, which is not limited in the present invention. When the first connecting part is connected to the root of the voice coil body and the voice coil body is wound, a leading wire may be reserved near the end face to conveniently lead the leading wire directly to the conductive member, such that the conductive member is in electrical communication with the voice coil.

Optionally, when the first connecting part of the conductive member is connected to the voice coil body, a first pad 3 is provided on the side of the voice coil body corresponding to the connection of the first connecting part, and the conductive member is in electrical communication with the voice coil via the first pad. Specifically, by connecting the first connecting part of the conductive member to the first pad, an electrical connection between the two is formed. At the same time, an electrical connection is formed between the voice coil body and the first pad. In this way, electrical conduction between the conductive member and the voice coil is formed.

As an embodiment, an enameled wire for transmitting the electrical signal extends from the voice coil body, and the first pad is welded and fixed to the enameled wire and the first connecting part respectively such that the conductive member is in electrical communication with the voice coil body. In this structure, the electrical signal received by the conductive member from outside the sound-producing device is first transmitted to the first pad, then to the enameled wire via the first pad, and further to the voice coil body. The voice coil vibrates under the action of the electric signal and the magnetic field of the magnetic circuit system.

Optionally, the first pad is provided with a bending structure protruding from the side of the voice coil body, and the bending structure is configured to hold the conductive member in position. The bending structure may have a slot which is snapped on the first connecting part of the conductive member, and the first connecting part when used is snapped in the slot to realize the connection of the first connecting part and the first pad. As another embodiment, the bending structure may be a snap ring whose axis is parallel to the side of the voice coil, and the first connecting part when being used passes through the snap ring to achieve a fixed connection with the first pad. A bending structure for positioning the conductive member is arranged on the first pad, which realizes the dual functions of positioning and conduction of the first pad at the same time. In addition, by using the bending structure for positioning, it has the advantages of simple structure and reliable position holding.

As another embodiment of the present invention, the first connecting part of the said conductive member is connected to the side of the said bobbin. That is, the first connecting part realizes the connection between the conductive member and the voice coil by being fixedly connected to the bobbin. In this structure, in order to realize the electrical connection between the conductive member and the voice coil, a second pad 4 is provided on the side of the bobbin corresponding to the connection of said first connecting part so as to weld and fix the first connecting part of the conductive member, such that the conductive member can transmit the electrical signal to the second pad. At the same time, the enameled wire for conducting electricity extending from the voice coil body is welded and fixed to the second pad to form electrical communication. Electrical communication is then established between the conductive member and the voice coil. By connecting the conductive member to the side of the bobbin, it is possible to avoid the interference between the assembly near the root of the voice coil and the conductive member, which facilitates the installation of the conductive member in the sound-producing device.

Optionally, the conductive member is of a separated structure and includes at least two conductors, each of which includes a first connecting part, a second connecting part and an elastic part connected between the first connecting part and the second connecting part. The conductors are respectively connected with the voice coil via the first connecting part, and are fixedly connected to the sound-producing device via the second connecting part. When two conductors are installed, they are installed along the circumference of the voice coil at a certain height of the voice coil. Preferably, the two conductors are distributed in a centrosymmetric form with respect to the center of the voice coil. The conductor in this installation mode can not only be used to input the electrical signal into the voice coil, but also can support the voice coil to prevent the voice coil from generating large polarization.

Preferably, the conductive member includes four conductors connected to the voice coil at the same height. The four conductors are evenly distributed along the circumference of the voice coil, which further strengthens the vibration adjustment effect of the voice coil.

Optionally, the conductive member includes four conductors, wherein first connecting parts of two adjacent conductors are connected to each other to form a first connection bridge 24, and first connecting parts of the other two conductors are connected to each other to form a second connection bridge; the conductive member is in electrical communication with the voice coil via the first connection bridge and the second connection bridge. Optionally, the connection bridge is in an arc-shaped structure or a convex-shaped structure. After the conductor is installed, the arc-shaped structure or the convex-shaped structure fits the side of the voice coil and occupies a certain arc in the circumference of the voice coil. As an embodiment, the conductor is connected to the bobbin, and the bobbin is provided with two second pads connected to the enameled wire of the voice coil body. The arc-shaped structure or the convex-shaped structure is welded on the second pad, so that the conductive member is electrically connected to the voice coil body. And, the bobbin is provided with a groove 111 for fixing the first connecting part of the conductor that is not welded with the second pad. The connection bridge can not only be used for electrical conduction between the voice coil and the conductive member, but also for the centering of the voice coil.

Optionally, the second connecting part of the conductive member is formed in a hook structure, the sound-producing device is provided with a hanger column 5 therein, and the hook structure is sleeved on the hanger column. In use, the conductive member is fixed on the hanger column via the hook structure. Implementing the connection between the conductive member and the sound-producing device in this way may simplify the installation process of the conductive member. Alternatively, the sound-producing device is provided with a hanging loop therein, and the hook structure may also be hooked on the hanging loop in the sound-producing device, which is not limited in the present invention. Optionally, the number of bending turns of the hook structure may be one turn or at least two turns, and when the number of bending turns of the hook structure is at least two turns, at least two turns of hook structures have overlapped orthographic projections in the vertical direction overlap. Increasing the number of bending turns of the hook structure is beneficial to stably fixing the conductive member on the sound-producing device; when the bending turn is set to be one turn, the whole conductive member is located in the same plane, which is beneficial to ensuring the flatness of the product.

Optionally, the sound-producing device further includes a magnetic conductive part in which a magnet is provided, the voice coil is provided in the magnetic conductive part and is subjected to the magnetic field of the magnet; the magnetic conductive part is provided with an avoidance slot, and after the conductive member is connected with the voice coil body, the conductive member passes through the avoidance slot and is fixed on the sound-producing device. Optionally, the magnetic conductive part is U iron, and when the conductive member is installed at the root position of the voice coil body or close to the root position of the voice coil body, the conductive member may interfere with the U iron. Therefore, it is necessary to open an avoidance slot on the magnetic conductive part corresponding to the installation position of the conductive member. At this time, after the conductive member is connected to the voice coil body, it passes through the opened avoidance slot, and then is connected to the sound-producing device. Optionally, the sound-producing device includes a casing on which the hanger column is provided, and the conductive member is connected to the hanger column of the casing after passing through the avoidance slot.

Optionally, the conductive member is formed by integrally winding a metal wire. As an embodiment, the elastic part is a planar structure formed by bending and winding a metal wire, and the planar structure has multiple bending structures, similar to a planar spring structure. The metal planar spring structure has good compliance and can be used as a damper for the sound-producing device to adjust the vibration of the voice coil, and the sound-producing device at this time has good acoustic performance. In addition, the metal material has good fatigue performance, and during the working process of the sound-producing device, it is easy to destroy fatigue, and it is able to effectively prolong the service life of the sound-producing device. In addition, a conductive member with the planar structure can be used to energize the voice coil, replacing the existing lead wire. The planar structure can reduce the installation space inside the sound-producing device, reduce the overall height of the sound-producing device, and make the sound-producing device tend to be miniaturized.

Optionally, the sound-producing device has a resonant frequency F0 of 50 Hz to 300 Hz. The resonant frequency F0 is an important parameter that affects the low-frequency performance of the sound-producing device, and its calculation formula is as follows:

$$F0=\frac{1}{2\pi}\sqrt{Kms/Mms}$$

Wherein: F0—resonant frequency;

π—pi;

Kms—mechanical stiffness;

Mms—equivalent mass.

It can be seen from the above formula that Kms and Mms are two factors that affect F0. The smaller the Kms, the smaller the resonant frequency F0, and the better the acoustic performance of the sound-producing device. The larger the Mms, the smaller the resonant frequency F0. Under the existing technical conditions, in order to obtain a small mechanical stiffness, it is inevitable that high demands are placed on the material properties, which will undoubtedly increase the manufacturing cost of the sound-producing device. On the other hand, if the resonant frequency F0 is reduced by increasing the equivalent mass of the sound-producing device, it not only violates the principle of making the product lightweight, but also adversely affects other performances of the sound-producing device. Therefore, the present invention limits the resonant frequency F0 to the range of 50 Hz to 300 Hz, so the sound-producing device can obtain good low-frequency acoustic performance, and at the same time, it is possible to balance the relationship between the product manufacturing cost and other performance of the sound-producing device and the low-frequency acoustic performance.

Figure 6:
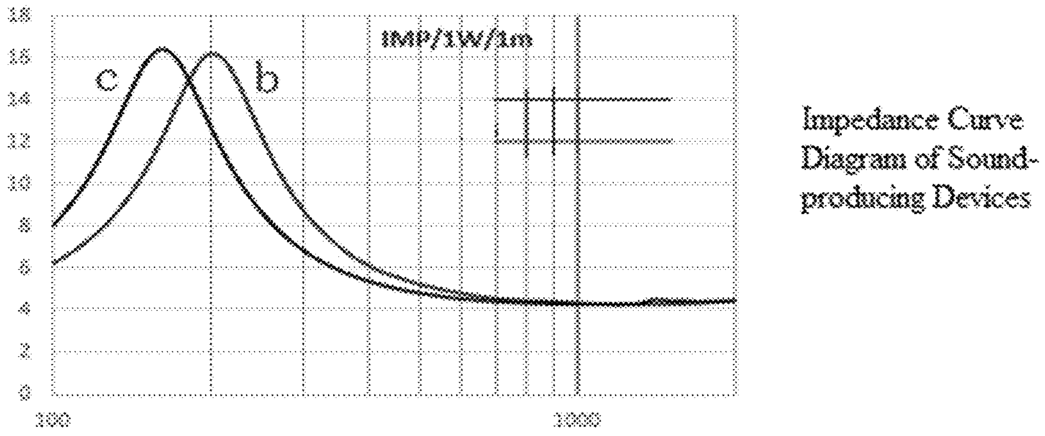
FIG. 6 is an impedance curve diagram of a sound-producing device according to an embodiment of the present invention and a conventional sound-producing device.

According to an embodiment of the present invention, the impedance of the sound-producing device (curve b) using the prior art damper and that of the sound-producing device (curve c) using the above-mentioned conductive member are tested, and the results are shown in FIG. 6. As can be seen from the figure, in the case of using the traditional damper, the detected resonant frequency F0 of the sound-producing device is about 195 Hz, while in the case of using the above-mentioned conductive member to replace the prior art damper, the detected resonant frequency F0 of the sound-producing device is about 170 Hz. It can be seen from the test results that by using the conductive member as the damper of the sound-producing device, it is possible to significantly reduce the resonant frequency F0 of the sound-producing device, improve the bass sensitivity, and thus improve the acoustic performance of the sound-producing device.

Figure 7:
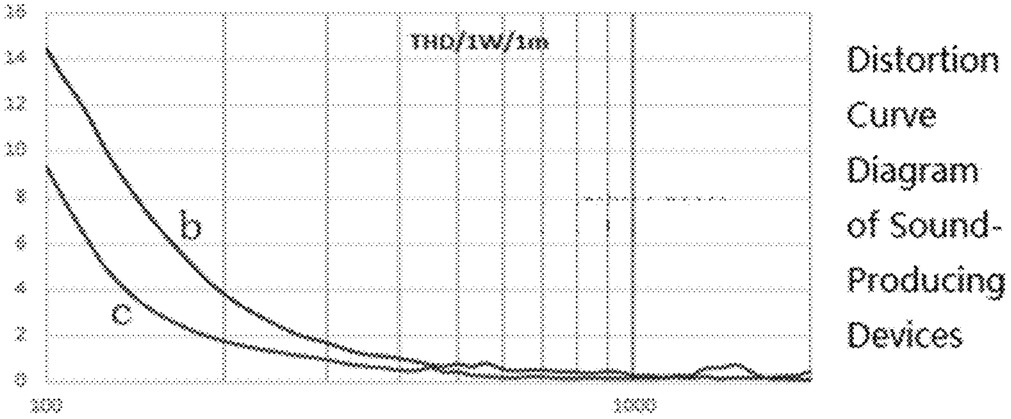
FIG. 7 is a distortion curve diagram of a sound-producing device according to an embodiment of the present invention and a conventional sound-producing device.

The total harmonic distortion THD is a parameter reflecting the sound reproduction degree of the sound-producing device. The larger the value is, the more serious the sound distortion of the sound-producing device is, and the worse the listening effect of the sound-producing device is. Therefore, a sound-producing device is required to have a small total harmonic distortion THD in order to obtain a good hearing. According to an embodiment of the present invention, the distortion of the sound-producing device (curve b) using the prior art damper and that of the sound-producing device (curve c) using the above-mentioned conductive member are detected, and the results are shown in FIG. 7. It can be seen from the figure that when the frequency band is lower than 1000 Hz, the detected total harmonic distortion THD of the sound-producing device using the traditional damper is significantly higher than that of the sound-producing device using the above-mentioned conductive member. Moreover, the lower the frequency band, the greater the difference between the two, and the more obvious the improvement effect on the total harmonic distortion THD of the sound-producing device. Therefore, by using the conductive member of the present invention as the damper of the sound-producing device, it is possible to significantly improve the sound reproduction degree and improve the listening effect of the sound-producing device.

Optionally, the total harmonic distortion THD of the sound-producing device is less than 10% within a frequency band of 100 Hz to 300 Hz. By limiting the total harmonic distortion THD of the sound-producing device to less than 10% in the above frequency range, it is possible to ensure that the sound-producing device has less sound distortion and the user can obtain a better listening effect. Preferably, when the frequency band is 200 Hz, the total harmonic distortion THD of the sound-producing device is limited to less than 2.5%. Preferably, when the frequency band is 300 Hz, the total harmonic distortion THD of the sound-producing device is limited to less than 2%.

Figure 8:
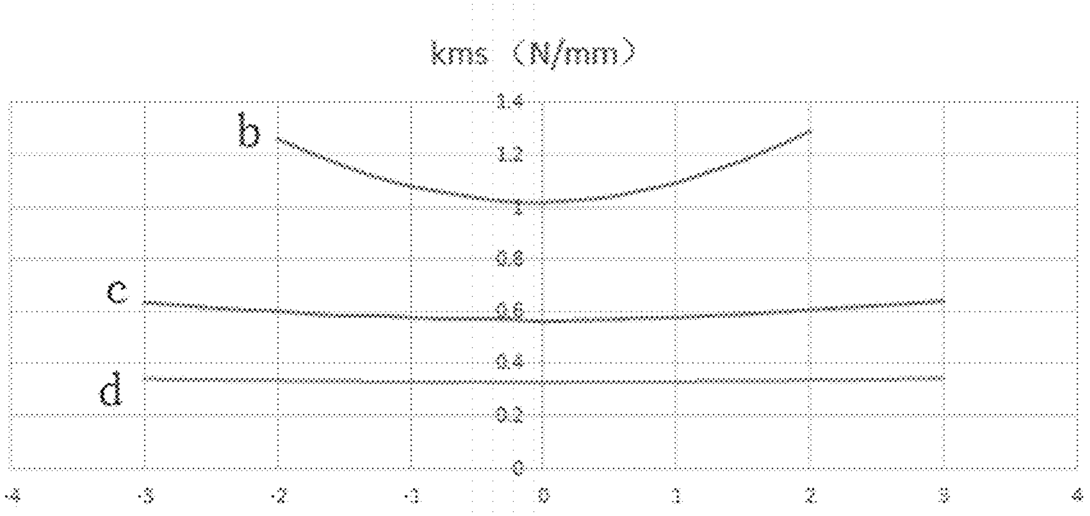
FIG. 8 is a graph of the mechanical stiffness value Kms corresponding to different acute angles $\alpha$.

In one embodiment, as shown in FIG. 8, a width of the elastic part 2 gradually increases along a direction from the first connecting part 1 to the second connecting part 3, with extension lines of two sides of the elastic part 2 in its width direction intersecting at a point in the direction in which the first connecting part 1 faces away from the second connecting part 3 and forming an acute angle $\alpha$. That is, the elastic part 2 forms a shape that approximates a sector. In one embodiment, the acute angle $\alpha$ is no less than 10°. Further, in a more preferred solution, the acute angle $\alpha$ is greater than 20°.

Through testing, it is found that the value of the acute angle $\alpha$ has a very obvious influence on the mechanical stiffness of the damper. See FIG. 6, in the case that the other parameters remain the same, with the increasing of the acute angle $\alpha$, the mechanical stiffness value Kms reduces, and the linear performance of the damper improves. The specific test data can be seen in Table 1 below:

TABLE 1

| Acute angle $\alpha$ | kms (N/mm) | Variation % @ 2 mm |
|---|---|---|
| 15° | 1.02 | 23.5% |
| 25° | 0.565 | 7% |
| 35° | 0.325 | 2% |

It can be seen from Table 1 that: when the acute angle $\alpha$ is 15°, the mechanical stiffness Kms of the damper is 1.02 N/mm, and the planar elastic part 2 of the damper exhibits a 23.5% variation of elastic force of when a 2 mm elastic deformation occurs; when the acute angle $\alpha$ is 25°, the mechanical stiffness Kms of the damper is 0.565 N/mm, and the planar elastic part 2 of the damper exhibits a 7% variation of elastic force of when a 2 mm elastic deformation occurs; when the acute angle $\alpha$ is 35°, the mechanical stiffness Kms of the damper is 0.325 N/mm, and the planar elastic part 2 of the damper exhibits a 2% variation of elastic force of when a 2 mm elastic deformation occurs.

It should be noted that, in this embodiment, only a circular sound-producing device is taken as an example for description, however, in specific applications, this technical solution can also be applied to a square sound-producing device; of course, it can also be applied to devices of other shapes, which does not limit the invention.

Optionally, the sound-producing device is a large bass or mid-range sound-producing device. The sound-producing device can be installed in the speaker. The number of the sound-producing devices may be set to two; or, one of the two is set as a sound-producing device and the other is set as a tweeter, which is not limited by the present invention. In another embodiment, the sound-producing device described above may be used as an on-board speaker. The sound-producing device described above may also be used in other devices, which is not limited in the present invention.

As an embodiment of the present invention, the present invention also provides an electronic terminal, including the above sound-producing device. The electronic terminal may be a car audio or a speaker.

Although the present disclosure has been described in detail in connection with some specific embodiments by way of illustration, those skilled in the art should understand that the above examples are provided for illustration only and should not be taken as a limitation on the scope of the disclosure. Those skilled in the art will appreciate that modifications may be made to the above embodiments without departing from the scope and spirit of the present disclosure. We therefore claim as our disclosure all that comes within the scope of the appended claims.

The invention claimed is:

1. A sound-producing device, comprising:

a voice coil including a bobbin and a voice coil body wound outside the bobbin; the voice coil body configured for input of an electrical signal;

a conductive member including a first connecting part connected with the voice coil, a second connecting part fixed to the sound-producing device, and an elastic part connected between the first connecting part and the second connecting part; the elastic part having a planar structure, and at least partially positioned in the same plane as the first connecting part;

wherein the conductive member is configured to input an electrical signal to the voice coil, the first connecting part of the conductive member is connected to a side of the voice coil body close to an end face of the voice coil body such that the conductive member is in electrical communication with the voice coil, the side of the voice coil body is provided with a first pad at a connection corresponding to the first connecting part, and the conductive member is in electrical communication with the voice coil via the first pad, and an enameled wire for transmitting the electrical signal extends from the voice coil body, and the first pad is welded and fixed to the enameled wire and the first connecting part such that the conductive member is in electrical communication with the voice coil body.

2. The sound-producing device of claim 1, wherein the first pad is provided with a bending structure protruding from the side of the voice coil body, and the bending structure is configured to hold the conductive member in position.

3. The sound-producing device of claim 1, wherein the first connecting part of the conductive member is connected to a side of the bobbin, and the side of the bobbin is provided with a second pad at a connection corresponding to the first connecting part, and the conductive member is in electrical communication with the voice coil via the second pad.

4. The sound-producing device of claim 1, wherein the conductive member is of a separated structure and includes at least two conductors, each of which includes a first connecting part, a second connecting part and an elastic part connected between the first connecting part and the second connecting part.

5. The sound-producing device of claim 4, wherein the conductive member includes four conductors connected to the voice coil at the same height.

6. The sound-producing device of claim 4, wherein the conductive member includes four conductors, wherein first connecting parts of two adjacent conductors are connected to each other to form a first connection bridge, and first connecting parts of two other conductors are connected to each other to form a second connection bridge; the conductive member is in electrical communication with the voice coil via the first connection bridge and the second connection bridge.

7. The sound-producing device of claim 1, wherein the second connecting part of the conductive member is formed in a hook structure, the sound-producing device is provided with a hanger column therein, and the hook structure is sleeved on the hanger column.

8. The sound-producing device of claim 1, wherein the sound-producing device further includes a magnetic conductive part in which a magnet is provided, the voice coil is provided in the magnetic conductive part and is subjected to the magnetic field of the magnet; the magnetic conductive part is provided with an avoidance slot, and after the conductive member is connected with the voice coil body, the conductive member passes through the avoidance slot and is fixed on the sound-producing device.

9. The sound-producing device of claim 1, wherein the conductive member is formed by integrally winding a metal wire;

the second connecting part includes a hook structure, is in a plane shape, and is located in the same plane as the first connecting part and the elastic part;

or, the second connecting part includes at least two hook structures whose orthographic projections in a vertical direction overlap.

10. The sound-producing device of claim 1, wherein a width of the elastic part gradually increases along a direction from the first connecting part to the second connecting part, with extension lines of two sides of the elastic part in its width direction intersecting at a point in the direction in which the first connecting part faces away from the second connecting part and forming an acute angle.

11. The sound-producing device of claim 10, wherein the acute angle is no less than 10°.

12. The sound-producing device of claim 1, wherein the sound-producing device has a resonance frequency F0 of 50 Hz to 300 Hz; in a frequency range of 100 Hz to 300 Hz, the sound-producing device has a total harmonic distortion THD of less than 10%.

13. The sound-producing device of claim 1, wherein the sound-producing device is a round sound-producing device or a square sound-producing device.

14. The sound-producing device of claim 1, wherein the sound-producing device is a large bass or mid-range sound-producing device.

15. An electronic terminal, comprising the sound-producing device of claim 1.

16. The electronic terminal of claim 15, wherein the electronic terminal is a car audio or a speaker.

* * * * *